US008372214B2

(12) United States Patent
Bittner

(10) Patent No.: US 8,372,214 B2
(45) Date of Patent: Feb. 12, 2013

(54) VAPOR EXTRACTOR FOR A WAREWASHER

(75) Inventor: James J. Bittner, Philadelphia, PA (US)

(73) Assignee: Insinger Machine Company, Philadelphia, PA (US)

( * ) Notice: Subject to any disclaimer, the term of this patent is extended or adjusted under 35 U.S.C. 154(b) by 398 days.

(21) Appl. No.: 12/695,214

(22) Filed: Jan. 28, 2010

(65) Prior Publication Data

US 2010/0186776 A1     Jul. 29, 2010

Related U.S. Application Data

(60) Provisional application No. 61/148,215, filed on Jan. 29, 2009.

(51) Int. Cl.
    *B08B 3/00*         (2006.01)
(52) U.S. Cl. .................. 134/58 D; 134/56 D; 134/57 D; 96/188
(58) Field of Classification Search .................. None
See application file for complete search history.

(56) References Cited

U.S. PATENT DOCUMENTS

| | | | |
|---|---|---|---|
| 4,084,947 A * | 4/1978 | Ear | 96/233 |
| 4,281,675 A | 8/1981 | Pure | |
| 5,343,632 A * | 9/1994 | Dinh | 34/507 |
| 5,497,798 A | 3/1996 | Fritz et al. | |
| 6,026,831 A | 2/2000 | Jarvis | |
| 6,170,166 B1 | 1/2001 | Johansen et al. | |
| 2006/0196528 A1 | 9/2006 | Jarvis | |
| 2007/0102026 A1 * | 5/2007 | Ahn et al. | 134/25.2 |

FOREIGN PATENT DOCUMENTS

| | | |
|---|---|---|
| EP | 0753282 B1 | 12/1998 |
| JP | 10328114 A * | 12/1998 |

OTHER PUBLICATIONS

Insinger, Specification Sheet for "Door Type, Single Tank Scullery Machine", Mar. 2005.
Insinger, Specification Sheets for "Commander 18-6VG Automatic Single Tank Door Type Dishwasher", Jul. 2009.
Hobart, Specification Sheets for "AM Select Ventless Dishwasher", Dec. 2009.

* cited by examiner

*Primary Examiner* — Eric Golightly
(74) *Attorney, Agent, or Firm* — Howson & Howson LLP

(57) ABSTRACT

A vapor extraction apparatus for a warewasher includes a housing in which a water-steam separation media is mounted. The housing has an inlet for receiving hot, humid air, water vapor and steam from a washing chamber of a warewasher, a blower for drawing the hot, humid air, water vapor and steam into the housing across the water-steam separation media, and an outlet for air dehumidified and cooled by the water-steam separation media to exit the housing. A duct connects the inlet to a washing chamber of a warewasher, and a bypass damper can be connected to the duct. The bypass damper is operable in a first position to permit air, water vapor and steam from the washing chamber to be drawn into the housing and in a second position to permit ambient room air to be drawn into the housing for cooling the vapor extraction apparatus.

5 Claims, 5 Drawing Sheets

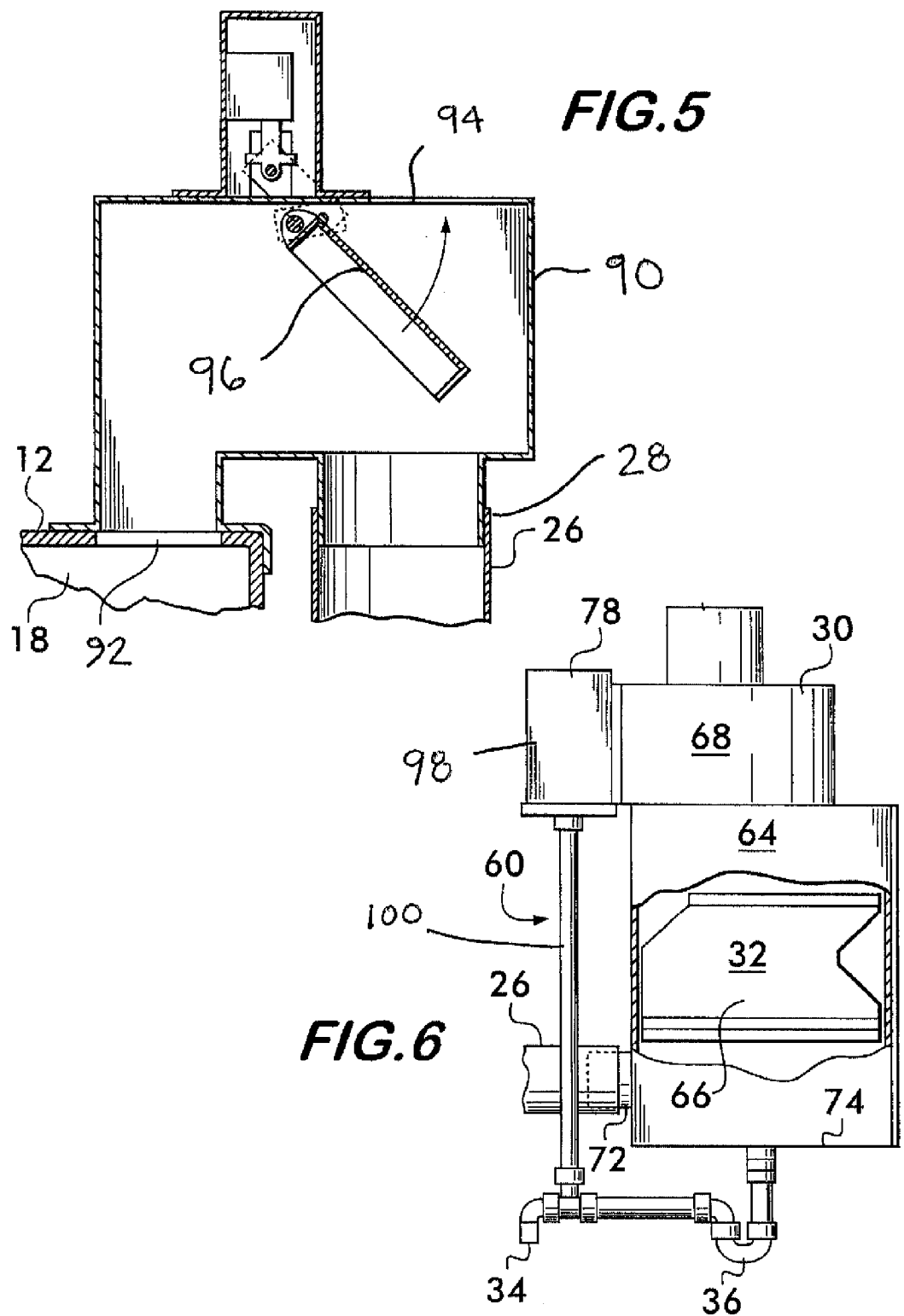

VAPOR EXTRACTOR FOR A WAREWASHER

CROSS-REFERENCE TO RELATED APPLICATIONS

This application claims the benefit under 35 USC §119(e) of U.S. Provisional Patent Application No. 61/148,215, filed Jan. 29, 2009.

BACKGROUND OF THE INVENTION

The present invention relates generally to apparatus for washing dishes, pots, cookware, silverware, utensils, glasses, trays, and like articles, and more particularly, the present invention relates to a warewasher that reduces or prevents the release of a blast of steam or hot air laden with water vapor and mist from the wash/rinse chamber of the warewasher when a door, curtain or the like of the warewasher is opened immediately following a wash and/or rinse cycle.

So called "door type" warewashers are commonly utilized by institutional organizations, such as prisons, schools, and the like, which are required to clean a large quantity of dishware, cookware, pots, pans, trays, utensils, silverware, drinking glasses, and/or like articles on a daily basis. Door-type warewashers include freestanding and undercounter units and can be specifically designed to handle a specific type of article, such as glassware or pots and pans. Door-type warewashers are also typically referred to as "stationary rack" warewashers since the rack loaded with the dishware and like articles remains substantially stationary within the chamber during the entire washing and rinsing process until the door of the warewasher is opened and the rack is removed. Typically, a door-type warewasher has a substantially rectangular wash/rinse chamber accessed by a door which, when closed, forms at least a part of one of the walls of the wash/rinse chamber. The chamber is adapted to receive one or more racks loaded with dishware and the like which are to be washed and rinsed within the chamber after the door is closed. Examples of commercially available door-type warewashers include Insinger Commander 18-5 Automatic Single Tank Door Type Dishwasher and Insinger Door Type, Single Tank Scullery Machine manufactured by Insinger Machine Company of Philadelphia, Pa.

So called "conveyor type" warewashers are also commonly utilized by institutional organizations, such as prisons, schools, and the like, which are required to clean a large quantity of dishware, cookware, pots, pans, trays, utensils, silverware, drinking glasses, and/or like articles on a daily basis. Conveyor-type warewashers are generally elongate and include opposite input and output ends between which dishware travel during a cleaning, rinsing, and/or sanitizing cycle. Some conveyor type warewashers are designed to receive and convey separate removable racks from the input end to the output end. Rackless systems, flight systems, and other systems are also utilized and may be designed to convey specific articles, such as trays or some other article. Conveyor-type warewashers typically do not have rigid doors; rather, some form of flexible curtain is typically utilized at the input and output ends which deflect to an open position when articles pass through the input and output ends.

A typical cleaning cycle may include a wash period, a hot rinse period, and a short dwell period between the wash and rinse periods or at the end of the cycle. Merely for purposes of example, a complete cycle may run for about 60 seconds, 90 seconds, or other predetermined period of time.

A significant amount of hot, highly-humidified air or steam and mist is generated within a warewasher by the end of a cleaning cycle, particularly as a result of the final rinse which is typically accomplished at a high temperature. Thus, when a door of the warewasher is opened at the end of a cleaning cycle to remove a rack of cleaned and/or sanitized dishware or the like, a cloud of steam and hot air laden with water vapor and mist is released/expelled into the surrounding work space or area within the room in which the warewasher is located, such as a commercial kitchen or the like. This can create safety problems and generally create discomfort for its operators.

Since commercial dishwashing and warewashing equipment produce a significant amount of steam vapor, many municipal, state, federal and military guidelines require that all commercial foodservice facilities (i.e., public school cafeterias, hospital kitchens, hotel dish rooms, U.S. Navy battleship galleries, etc.) employ a dedicated ventilation system for the removal of the steam vapor. Thus, an operator of the above referenced warewashers must typically install and operate a comprehensive ventilation system to provide proper ventilation and maintain an efficient kitchen work environment.

Such ventilation systems are typically costly to construct, difficult to develop using existing ductwork, can involve significant complexities, and require frequent maintenance. In addition, the use of such ventilation hoods, which typically are run at 100% capacity throughout the day, can result in a significant waste of energy and energy costs including electrical energy costs to operate the hood and the loss of HVAC-treated room air.

Although the aforementioned door-type, stationary-rack warewashers and conveyor-type warewashers function satisfactorily for their intended purposes, there is a need for improved dishwashers and warewashers which prevent the release of a cloud of steam and hot air laden with water vapor and mist upon the opening of a door of the warewasher following the completion of each cleaning cycle. Such a system should provide the benefit of eliminating the need for an externally vented hood system thereby providing initial cost savings related to purchasing and installing a hood ventilation system and continual savings relative to eliminating the undesired venting of HVAC-treated room air. In addition, the warewashers/dishwashers should provide energy savings, provide reduced noise levels, provide improved indoor air quality, and enhance machine operator safety and comfort.

SUMMARY OF THE INVENTION

According to a first aspect of the present invention, a vapor extraction apparatus for a warewasher is provided. The extractor includes a closed-wall, hollow housing in which a water-steam separation media is mounted above a water-tight base connecting to drainage piping. The housing also includes an inlet for receiving a flow of hot, humid air, water vapor and steam from a washing chamber of a warewasher, a blower located within the housing for drawing the hot, humid air, water vapor and steam into the housing and across the water-steam separation media, and an outlet adjacent the blower for air flowing through the housing and being dehumidified and cooled by the water-steam separation media to exit the housing to ambient room air. The vapor extractor can also include a duct connecting the inlet to a washing chamber of a warewasher, and a bypass damper connected to the duct. The bypass damper being positionable between a first position permitting hot, humid air, water vapor and steam from the washing chamber to be drawn into the duct and housing and a second position permitting ambient room air to be drawn into the duct and housing for purposes of cooling the vapor extraction apparatus.

According to another aspect of the present invention, a warewasher having an external vapor extractor is provided. The warewasher has walls and a hood defining an enclosure forming a washing, rinsing or sanitizing chamber of the warewasher, and the vapor extractor has a closed-walled, hollow housing containing a water-steam separation media mounted above a water-tight base connecting to drainage piping. The vapor extractor has a blower, an outlet adjacent the blower communicating with ambient room air, and an inlet. A duct interconnects an opening in the hood of the chamber to the inlet of the vapor extractor such that operation of the blower permits hot, humid air, water vapor and steam from the chamber to be drawn into the duct and vapor extractor housing, across the water-steam separation media where the hot, humid air, water vapor and steam is dehumidified and cooled, past the blower, and ultimately through the outlet of the vapor extractor where a dehumidified and cooled flow of air is directed into ambient room air.

The warewasher can include a bypass damper mounted on the hood of the chamber and connected to the duct. The bypass damper is positionable between a first position permitting hot, humid air, water vapor and steam from the chamber to be drawn into the duct and vapor extractor during a vapor extraction cycle and a second position permitting ambient room air to be drawn into the duct and vapor extractor for purposes of cooling the vapor extractor.

At least one of the walls defining the chamber of the warewasher can include a door enabling articles to be loaded or unloaded from the chamber. The warewasher can also include a door lock mounted on the warewasher and being operable to lock the door closed during washing, rinsing or sanitizing cycles of the warewasher and the vapor extraction cycle to prevent inadvertent release of the hot, humid air, water vapor and steam from the chamber directly into ambient room air.

The warewasher can also include an ambient air intake opening and damper on one of its walls. The ambient air intake damper is operable to permit ambient room air to be drawn into the chamber via the air intake opening via operation of the blower only when the hot, humid air, water vapor and steam from the chamber is drawn into the duct during a vapor extraction cycle.

According to a further aspect of the present invention, a method of operating a warewasher is provided. The warewasher is loaded with articles to be cleaned in an enclosed chamber of the warewasher during a standby mode of the warewasher. The articles are then washed, rinsed and/or sanitized during a wash cycle, and after the wash cycle, hot, humid air, water vapor and steam from the chamber is removed from the chamber during a vapor extraction cycle and directed into an enclosed vapor extractor. While the hot, humid air, water vapor and steam is evacuated from the chamber, ambient room air is permitted to enter the chamber. The hot, humid air, water vapor and steam within the vapor extractor is dehumidified, and the dehumidified air is released by the vapor extractor into ambient room air while liquid condensing within the vapor extractor is directed to a building drain via drainage piping. After the step of removing the hot, humid air, water vapor and steam from the chamber, the articles are accessed and unloaded from the warewasher.

The method can also include the steps of automatically activating a damper of a bypass damper to enable the hot, humid air, water vapor and steam from the chamber to be drawn into the vapor extractor during the vapor extraction cycle and automatically activating the damper of the bypass damper during non-vapor extraction cycles to enable only ambient room air to be drawn into the vapor extractor for purposes of cooling the vapor extractor. In addition, the method can include the step of automatically activating a door lock to lock a door of the warewasher during the wash cycle and during the vapor extraction cycle to prevent inadvertent release of the hot, humid air, water vapor and steam from the chamber directly into ambient room air. Still further, the method can include automatically activating a chamber air intake damper of an air intake opening in a wall of the chamber during the vapor extraction cycle to permit ambient room air to enter the chamber.

BRIEF DESCRIPTION OF THE DRAWINGS

The features of the present invention should become apparent from the following description when taken in conjunction with the accompanying drawing, in which:

FIG. 5 is a cross-sectional view of a bypass damper located on the hood of the warewasher taken along line 5-5 of FIG. 1;

FIG. 6 is an elevational view of a vapor extractor unit with a portion of its housing cut-away.

DETAILED DESCRIPTION OF THE INVENTION

Figure 1:
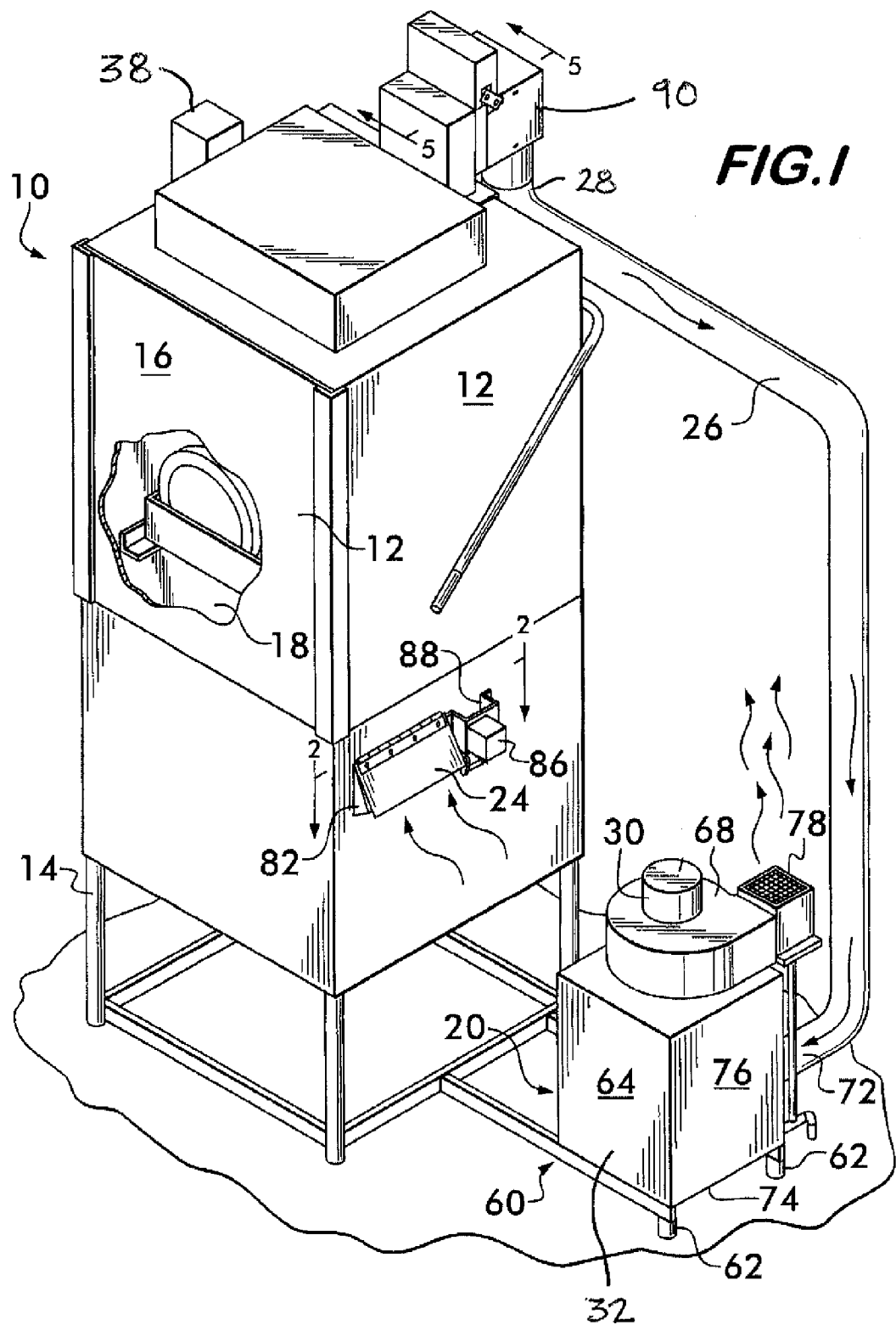
FIG. 1 is a perspective view of a warewasher having a vapor extraction system according to the present invention.

The present invention relates to a warewasher, dishwasher or the like having a vapor extraction system. For purposes of convenience, the term warewasher is used throughout this description and refers to any type of warewasher including dishwashers, washers for pots and pans, tray washers, stand-alone warewashers, undercounter warewashers, door-type warewashers, and conveyor or flight-type warewashers. The present invention is also directed to a vapor extraction system assembly and to a method of extracting vapor from a warewasher.

As discussed above, a large amount of water vapor/steam is produced as a result of normal operation of commercial warewashers. Water is heated within the warewasher and vapor or steam is formed and builds up in the atmosphere contained within the warewasher chamber or cavity. The instant reaction of hot, humid air (i.e. inside the recently-operated warewasher) with cool ambient or conditioned air at room temperature creates a large "plume" or cloud of steam when the dishwasher is opened by the machine operator of a door-type warewasher or by dishware passing through and automatically opening flexible curtains of a conveyor-type warewasher. In addition, a thin, film-like layer of water or other fluid typically resides on dish, glass, flatware and like surfaces as well as the internal surfaces of the warewasher since, when the water vapor collides with cooler ambient or room air, the moisture in the water vapor turns into condensation on the surfaces of the dishware and the like.

The present invention resolves the above problems by extracting the hot, humid air, and water vapor from the warewasher before it otherwise escapes into the surrounding kitchen environment. The extracted water vapor is directed to a vapor extractor which removes the energy from the water vapor and collects the resulting condensation. The condensation provides a pool of water which is directed to an existing drain of the building. The hot, humid air having been cooled and dehumidified is vented directly into the surrounding kitchen environment.

Thus, when the door or the like of the warewasher of the present invention is opened, no plume of steam is released. This eliminates the need and cost of a separate hood ventilation system. In addition, the operator will notice a substantial improvement to the quality of dishware and like articles cleaned. By removing the steam from the cavity of a warewasher according to the present invention, there is no thin layer of water on the surfaces of the warewasher or washed dishware thereby substantially improving sanitation quality of the washed dishware.

The water vapor extraction process can take place at the end of a normal final rinse cycle to preserve the integrity of the washing and sanitizing process. In addition, for purposes of preventing short circuiting of this process and of preserving the sanitation process, a door interlock can be utilized to lock the door or doors of the warewasher closed until the steam extraction process is complete.

Descriptions of various contemplated embodiments of the present invention with respect to a door-type warewasher, an extraction unit, a conveyor-type warewasher, and methods are provided below. These descriptions are not intended to be limiting and merely provide examples of the present invention.

Door-Type Warewasher

An example of a door-type, stationary-rack, stand-alone warewasher 10 is illustrated in FIG. 1. Such a warewasher 10 typically has walls 12 made of stainless steel supported on a frame 14 also preferably made of stainless steel. The walls 12 define a sealed wash/rinse chamber 18 into which a separate, removable rack containing and supporting dishware and/or like articles can be loaded.

One or more of the walls 12, or a section of one or more of the walls 12, of the warewasher 10 has at least one door 16 which can be positioned, manually or otherwise, in an open position to load, or unload, racks of dishware and in a closed position to seal the wash/rinse chamber 18 so that a cleaning cycle can be initiated. By way of example, the warewasher 10 can have a single door 16 or multiple (i.e., two, three, or more) doors which cooperatively open to permit access to the wash/rinse chamber 18.

A set of spray arms and/or nozzles (not shown) are located in the wash/rinse chamber 18 for directing a heated fluid at the dishware or like articles supported on the rack during a cleaning cycle. To this end, the cleaning cycle can include both a wash cycle for directing hot soapy water at the dishware or like articles and a hot rinse cycle for directing hot rinse water at the dishware or like articles and/or for sanitizing the dishware or like articles. A dwell period can occur between the wash and rinse cycles and/or at the end of the cleaning cycle. Merely for purposes of example, an entire cleaning cycle may take only about 60 seconds. Of course, any other period of time can also be used; for instance, the cleaning cycle can take about 90 seconds or more.

The door 16 remains in a closed position during the entire cleaning cycle to prevent heat, steam, water vapor, and the spray of fluid from escaping the wash/rinse chamber 18. An automated door lock 38 can be activated to prevent an operator from inadvertently opening the door 16 during a wash, rinse, sanitizing, and/or vapor extraction cycle. Operation of the door lock 38 can be automated to permit opening of the door or doors 16 only when a cleaning cycle and/or vapor extraction cycle has completed to enable unloading and loading between such cycles.

According to the present invention, a normal cleaning cycle is followed by a vapor extraction period in which the door 16 of the warewasher 10 remains closed (and locked) and steam and hot air laden with water vapor within the chamber 18 is removed from the chamber 18 and replaced with a fresh supply of ambient air. After the vapor extraction period is complete, a cycle indicator light or like indicator (i.e., visual or sound) alerts the operator that the cycle is complete and that the door 16 of the warewasher 10 can be opened for removal of the rack of cleaned dishware or like articles. The door lock 38 is automatically disengaged from the door 16 upon completion of the vapor extraction cycle. With such a system, a significant blast or cloud of steam and hot highly-humidified air and mist is neither released nor expelled from the wash/rinse chamber 18 through the open door 16 upon its opening following each cleaning cycle. Thus, there is no need for a ventilation hood or like system.

Figure 3:
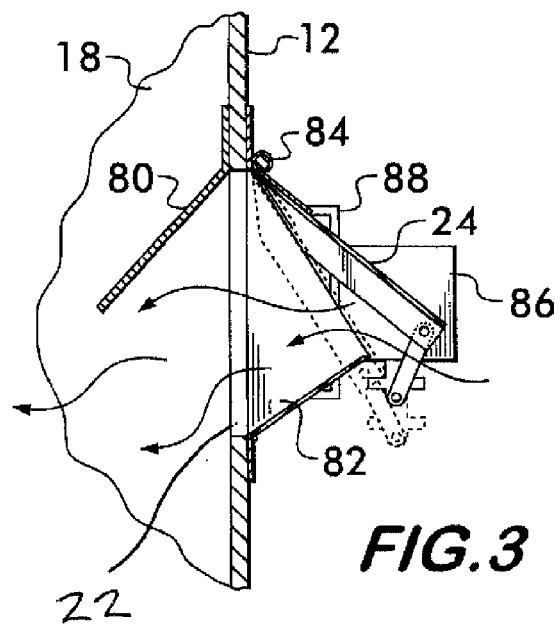
FIG. 3 is an additional cross-sectional view of the intake damper taken along line 3-3 of FIG. 2.
Figure 4:
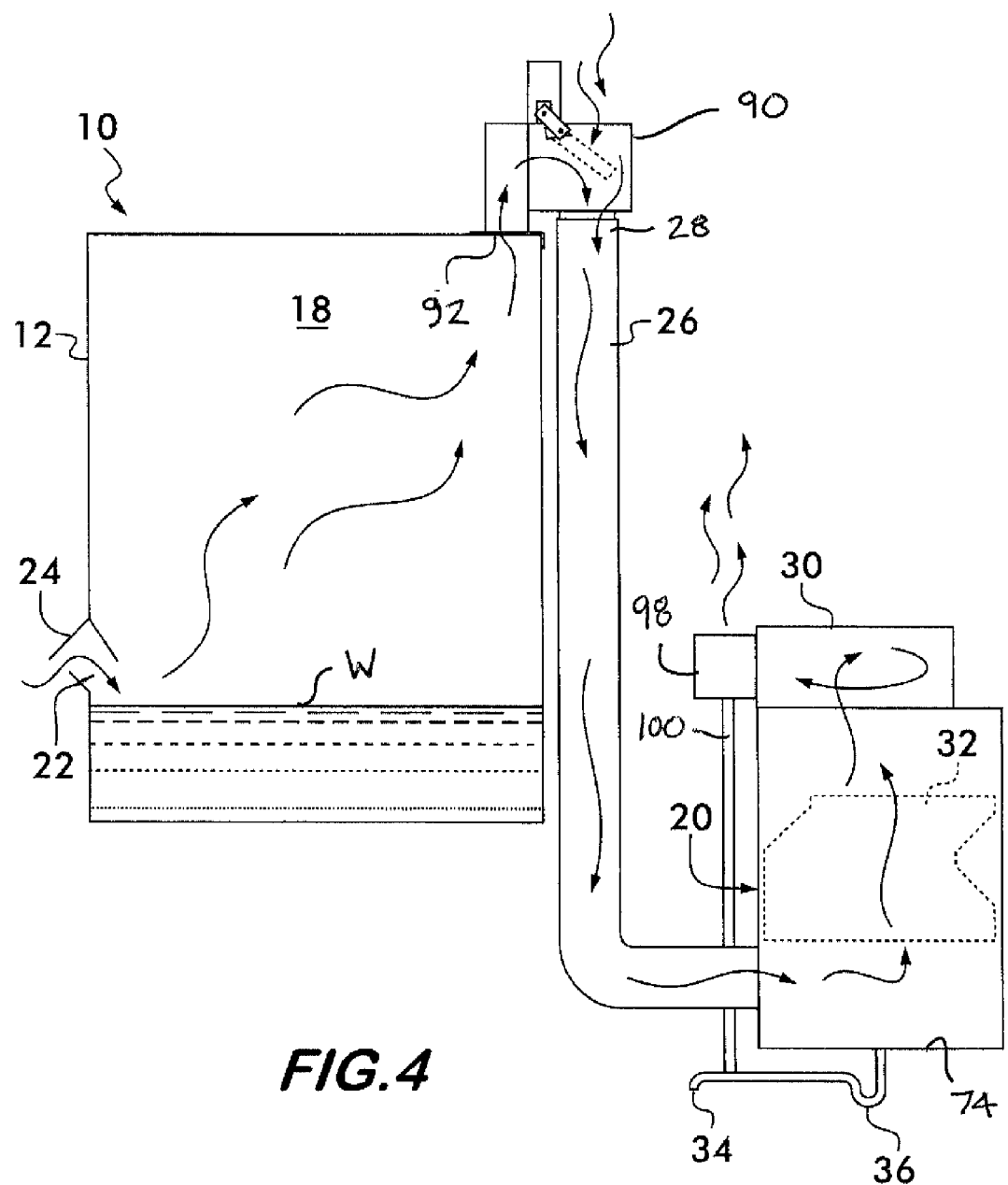
FIG. 4 is a simplified schematic view illustrating the path of steam and air through the warewasher of FIG. 1.

The vapor extraction system 20 includes a warewasher chamber intake opening 22 and damper door 24 for the intake of fresh ambient air into the chamber 18 (see FIGS. 1-4) and a conduit or duct 26 or the like providing a passageway for transferring the steam and hot humid air out of the chamber 18 (see FIGS. 1 and 4). An inlet 28 of the conduit 26 is located on or adjacent the top or hood of the chamber 18 where steam and hot humid air is best drawn into the conduit 26 via operation of a blower, or fan 30. This stream of steam, hot humid air, and mist is drawn through or directed to a mist extractor or condensation unit 32 where water droplets, mist and water vapor are removed from the air stream. The liquid moisture is collected from the extractor 32 and is of a temperature that can be directed into a drain 34 of a normal building drainage system, such as via a condensate trap 36 or like drainage piping. The stream of air exiting the extractor 32 has been at least somewhat cooled and dehumidified by passing through the extractor 32 and is of a temperature and condition that permits it to be safely vented into the work space.

Figure 2:
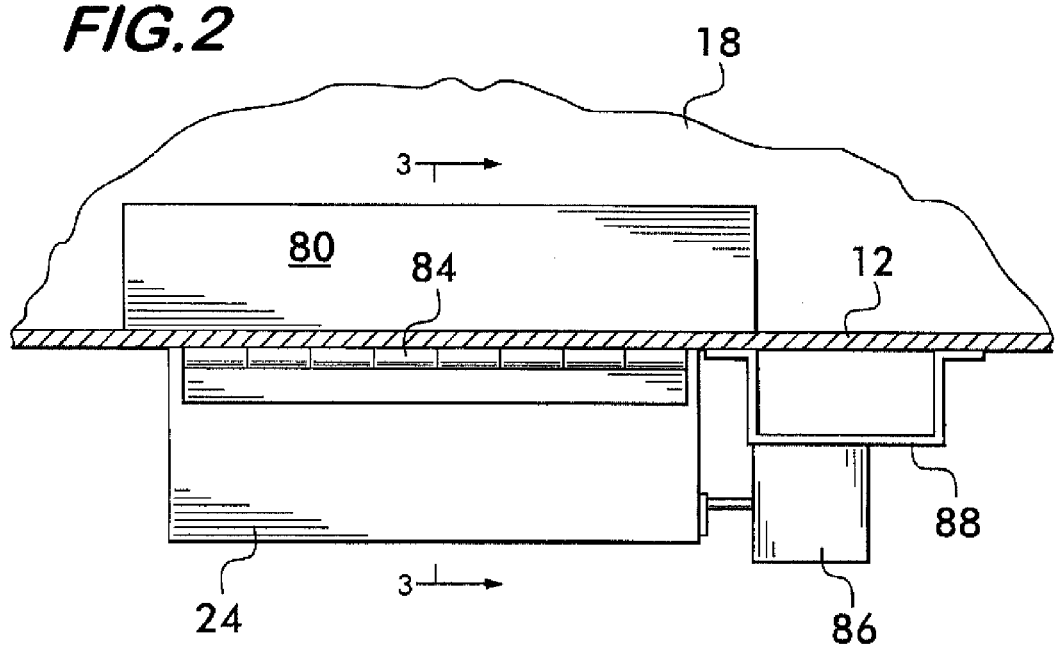
FIG. 2 is a cross-sectional view of an intake damper of the warewasher taken along line 2-2 of FIG. 1.

FIGS. 2 and 3 illustrate one proposed embodiment of a damper opening 22 and damper door 24. A splash guard plate 80 extends within the wash/rinse chamber 18 and extends from the wall 12 adjacent the top of the opening 22 and is angled downwardly to partially cover the opening 22 and reduce the effects of splashing. In addition, a damper duct 82 extends from the opening 22 on an exterior side of the wall 12 and angles upwardly to further prevent splash out. The damper door 24 connects to the exterior of the wall 12 via a hinge 84 extending adjacent and across the top of the opening 22, and in a closed position, closes the damper duct 82. The door 24 is opened and shut via an electoral solenoid 86 mounted on a raised support plate 88 adjacent the door 24.

The damper door 24 is closed and seals the damper opening 22 during all times, with the exception of the vapor extraction period. Accordingly, at the start of the vapor extraction period, the damper door 24 is opened from its normally-closed position. The damper opening 22 is preferably located only slightly above the water level "W" within the warewasher 10. For example, see FIG. 4. Thus, when the blower 30 draws a quantity of steam and hot humid air at the top of the chamber 18 into the conduit 26, a substantially equal amount of fresh ambient air is automatically drawn into chamber 18 via the intake damper opening 22. This fresh supply of ambient air helps to dry and cool the interior surfaces of the warewasher 10 and the surfaces of the articles being cleaned/sanitized.

Preferably, the vapor extraction period is a relatively short timed period which only needs to be sufficiently long to permit removal of a majority of the steam and hot humid air residing in the chamber 18 immediately following a cleaning cycle. For example, the extraction period can be a few seconds or a few tens of seconds. At the completion of the timed extraction period, the intake damper door 24 is returned to its original normally-closed condition and a cycle-completion indicator is activated. Thereafter, the door 16 of the warewasher 10 can be opened to permit cleaned dishware to be removed and replaced with a rack of dishware requiring cleaning. Each time the door 16 of the warewasher 10 is opened at the completion of cleaning and vapor extraction cycles, the operator is not subjected to a blast of steam, mist, and hot humid air.

FIG. 5 illustrates a bypass damper assembly 90 that is mounted on the top or hood of the warewasher 10 and that provides a connection between the inlet 28 of the duct 26 and an opening 92 in the top of the warewasher 10 communicating with the chamber 18. The assembly 90 includes an opening 94 that is in communication with ambient room air and a bypass damper 96. The damper 96 can be automatically positioned in a first position (a vertical position as shown in FIG. 5) to seal the conduit 26 from the chamber 18 of the warewasher 10 and to permit ambient room air to be drawn through the conduit 26 by operation of the blower 30. The flow of room air through the extractor 32 can be utilized to cool the various components of the extractor 32. The damper 96 can also be positioned in a second position (a horizontal position as shown in FIG. 5) to seal the conduit 26 from ambient room air and to enable steam and water vapor to be extracted from the chamber 18 of the warewasher 10. The damper 96 can also be positioned in an intermediate position to permit steam and water vapor from chamber 18 and fresh room air to be drawn simultaneously into the extractor 32.

Vapor Extractor

The extractor 32 can be any type of mist eliminator or condensation unit that enables moisture to be removed from hot humid air. For example, the extractor 32 can include a set of cooled coils over which the hot humid air flows and on which condensation forms. The condensation can be collected and drained, while an amount of heat from the air can be removed. Of course, other types of vapor extractors can be used.

The vapor extraction system 20 according to the present invention can be a stand-alone unit. For example, FIGS. 1, 4 and 6 illustrate a stand-alone vapor extractor machine or box 60 that is fastened with framework to the base of the frame 14 of the warewasher 10. The machine 60 can include support legs 62, an intermediate closed-wall body 64 in which a vapor extractor or water-steam separating media 66 is housed, and an upper cover 68 extending over the blower or extractor fan 30. An inlet connection 72 extends from the intermediate closed-wall body 64 adjacent a base 74 of the body 64. The inlet 72 is connected to the conduit 26 which connects to the wash/rinse chamber 18 of the warewasher 10. Thus, the inlet 72 receives the hot humid air, steam and mist from the warewasher 10 and directs the air and steam into the intermediate body 64. The inlet 72 can also receive fresh ambient room air via conduit 26 when the bypass damper 96 is positioned to block and/or partially block the conduit 26 from the chamber 18. The flow of ambient air can be used to cool the components of the extractor 32.

The intermediate body 64 of the machine 60 is generally hollow and houses the vapor extractor 66. As best illustrated in FIGS. 4 and 6 in which a front cover 76 of the body 64 is at least partially not shown, the inlet 72 is located below the vapor extractor 66, and the blower 30 draws the hot, humid air, steam and mist upwardly into and across the vapor extractor 66. The condensate and liquid moisture extracted from the air drains to the base 74 of the body 64 to a drain 34 via a condensate trap 36 or the like. The dehumidified air continues its travel upward to the blower 30 and is directed through an outlet 78 formed by the blower 30 and/or upper cover 68. The outlet 78 returns the dehumidified air to the room.

The extractor 32 can also include a extractor fan discharge assembly 98 to collect any water droplets that may pass through the water-steam separating media 66 and fan 30. The assembly 98 can be located directly below the air outlet 78 of the extractor and include a baffle for collecting water droplets and for directing them through a conduit 100 to the drain 34.

Conveyor-Type Warewasher

The above referenced extractor 32 can also be utilized with a conveyor-type warewasher (not shown). Such an arrangement can include the duct 26 and extractor 32 described above. In addition, a damper assembly such as bypass damper assembly 90 can be mounted on a top or hood of the warewasher adjacent an outlet end of the conveyor-type warewasher. The damper assembly can be used to provide a desired mixture of room air and warewasher chamber air to the extractor 32 on a continuous, continual, or periodic basis.

The conveyor-type warewasher does not require the use of an intake damper; rather, as dishware is continuously or periodically loaded into the input end of the conveyor-type warewasher or follows a path through an output end of the warewasher, ambient room air is drawn through the flexible curtains of the input and output ends of the warewasher. Thus, the vapor extraction cycle can be run periodically at precisely timed intervals.

Methods of Operation

Figure 7:
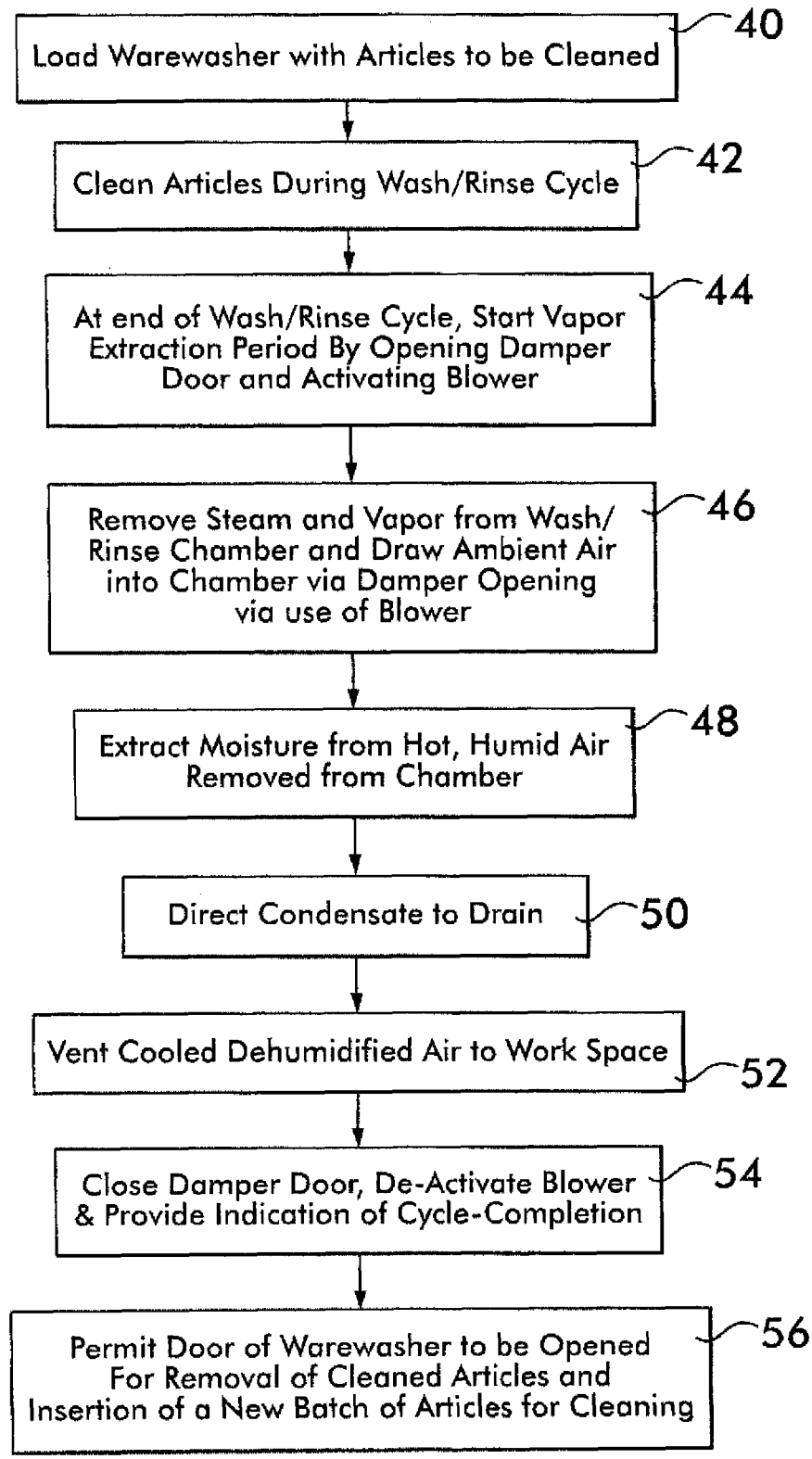
FIG. 7 is a flow diagram showing the steps of one embodiment of a method according to the present invention.

The present invention also relates to a method of washing dishware or the like. For example, as best shown in FIG. 7, the method can include the steps of loading a warewasher with articles to be cleaned (step 40), cleaning the articles during a wash/rinse cycle (step 42), and subjecting the articles to a vapor extraction period (steps 44, 46, 48, 50, 52 and 54) before permitting the door of the warewasher to be opened (step 56).

The vapor extraction period is preferably a timed period which starts with the opening of the intake damper door 24 (step 44). The blower 30 draws steam, humid air, and mist from the top of the wash/rinse chamber 18 into the duct 26. This also automatically draws fresh ambient air into the warewasher chamber 18 via the intake damper opening 26 (step 46). The steam, humid air, and mist is directed by the duct 26 to an extractor box 32 where moisture is extracted and the liquid moisture is collected and directed toward a building drain (step 50) while dehumidified air is vented into the work space (step 52).

After the timed extraction period is complete, the intake damper door is closed, and the operator is notified by an indicator light or the like that the door of the warewasher can be opened (step 54). At this point, the operator opens the door, removes the rack of cleaned dishware and can replace it with a rack carrying a new set of dishware requiring cleaning. When the operator opens the door of the warewasher, he/she is not subject to a release/blast of steam and hot humid air.

The method can also include operation of a bypass damper assembly 90 on the hood of the warewasher. The damper 96 of the bypass damper assembly can be operated to permit warewasher chamber air, fresh ambient room air, or a desired mixture of both to be drawn into the duct 26. Room air can be provided to the extractor for purposes of cooling extractor components during non-vapor extraction cycles.

In addition, the method can include the automatic operation of a warewasher door lock 38 to prevent undesired opening of the door 16 of the warewasher during washing and/or vapor extraction cycles and to only permit opening of the door 16 of the warewasher when it is time to unload and/or load the warewasher.

Merely for purposes of example, the warewasher and vapor extraction system can be automated to operate as follows. During a stand-by mode of a door-type warewasher, the door lock 38 can be unlocked, the intake damper 24 can be closed, the bypass damper 96 can be opened to room air and closed to warewasher air, and the fan 30 can be on or off depending upon whether or not it is desired to have room air flow through the extractor 32 to cool its components. During the stand-by mode, the warewasher can be loaded and/or unloaded with dishware or like articles.

When a wash cycle is started, the door lock 38 is automatically locked, the intake damper 24 remains closed, the bypass damper 96 remains open to room air only, and the extractor fan 30 can be on. At the end of the wash/rinse/sanitizing cycle, the door lock 38 remains locked, the intake damper 24 opens, the bypass damper 96 opens to warewasher air and closes to room air, and the fan 30 remains on to draw the warewasher air into and through the extractor 32. At the end of the vapor extraction cycle, the door lock 38 is automatically unlocked, the intake damper 24 is closed, the bypass damper 96 is opened to room air and closed to warewasher air, and the fan can be on or off. This returns the unit back to the standby mode discussed above.

While preferred warewashers, vapor extractors, and methods have been described in detail, various modifications, alterations, and changes may be made without departing from the spirit and scope of the present invention.

I claim:

1. A warewasher, comprising:
   walls and a hood defining an enclosure forming a washing, rinsing or sanitizing chamber of the warewasher, said walls having a door;
   a vapor extractor external of said chamber and having a closed-walled, hollow housing containing a water-steam separation media, said vapor extractor having a blower, an outlet adjacent said blower communicating with ambient room air, and an inlet;
   a duct interconnecting an opening in said hood of said chamber to said inlet of said vapor extractor such that operation of said blower permits hot, humid air, water vapor and steam from said chamber to be drawn into said duct and housing, across said water-steam separation media where said hot, humid air, water vapor and steam is dehumidified and cooled, past said blower and through said outlet where a dehumidified and cooled flow of air is directed into ambient room air;
   a bypass damper mounted on said hood of said chamber and being connected to said duct, said bypass damper being positionable between a first position permitting hot, humid air, water vapor and steam from the said chamber to be drawn into said duct and said vapor extractor during a vapor extraction cycle and a second position permitting ambient room air to be drawn into said duct and said vapor extractor for purposes of cooling said vapor extractor;
   a door lock mounted on the warewasher and being operable to lock said door closed during washing, rinsing or sanitizing cycles of the warewasher and said vapor extraction cycle to prevent inadvertent release of the hot, humid air, water vapor and steam from said chamber directly into ambient room air; and
   an ambient air intake opening and damper on one of said walls of the warewasher, said ambient air intake damper being operable to permit ambient room air to be drawn into said chamber via said air intake opening via operation of said blower only when the hot, humid air, water vapor and steam from said chamber is drawn into said duct during a vapor extraction cycle.

2. A warewasher according to claim 1, wherein said bypass damper is positionable into a position enabling a mixture of hot, humid air, water vapor and steam from said chamber and ambient room air to be drawn into said duct and vapor extractor.

3. A warewasher according to claim 1, further comprising a wash tank below said chamber containing a washing or rinsing liquid, and wherein said ambient air intake opening and damper are located slightly above a level of said washing or rinsing liquid.

4. A warewasher according to claim 3, wherein said vapor extractor includes a fan discharge assembly, drainage piping and a water-tight base connected to said drainage piping, wherein said water-steam separation media is mounted above said water-tight base, wherein said blower and said outlet of said vapor extractor are located above said water-steam separation media, and wherein said fan discharge assembly is located adjacent said outlet for collecting water droplets passing through said water-steam separation media and said blower and for directing the water droplets to said drainage piping.

5. A warewasher according to claim 4, wherein said chamber of the warewasher and said housing of said vapor extractor are separate, and further comprising framework for connecting said housing in a stationary position to a frame of the warewasher.

* * * * *